(12) United States Patent
Brieskorn

(10) Patent No.: US 12,293,332 B2
(45) Date of Patent: *May 6, 2025

(54) COMPUTER-IMPLEMENTED METHOD FOR CONTROLLING A COLLABORATION PLATFORM, COMMUNICATION AND COLLABORATION APPLICATION AND COMMUNICATION AND COLLABORATION PLATFORM

(71) Applicant: RINGCENTRAL, INC., Belmont, CA (US)

(72) Inventor: Juergen Brieskorn, Geltendorf (DE)

(73) Assignee: RINGCENTRAL, INC., Belmont, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/846,291

(22) Filed: Jun. 22, 2022

(65) Prior Publication Data
US 2022/0327485 A1    Oct. 13, 2022

Related U.S. Application Data

(63) Continuation of application No. 16/638,160, filed as application No. PCT/EP2018/072442 on Aug. 20, 2018, now Pat. No. 11,397,920.

(30) Foreign Application Priority Data

Aug. 22, 2017    (DE) .......................... 102017119183.6

(51) Int. Cl.
G06Q 10/101    (2023.01)
G06Q 10/10    (2023.01)
(Continued)

(52) U.S. Cl.
CPC ......... *G06Q 10/101* (2013.01); *G06Q 10/103* (2013.01); *H04L 5/0055* (2013.01); *H04L 51/216* (2022.05); *H04L 65/403* (2013.01)

(58) Field of Classification Search
CPC .............................. H04L 51/216; G06Q 10/10
See application file for complete search history.

(56) References Cited

U.S. PATENT DOCUMENTS 999,018 A      7/1911    Duncan
9,990,108 B2 *  6/2018    Henderson .............. H04L 51/04
(Continued)

FOREIGN PATENT DOCUMENTS

WO    WO 2008/063490 A2    5/2008

OTHER PUBLICATIONS

Qualitatsmanagement-Dokumentationen einfacher verwalten mil Mircosoft Sharepoint, Agenturblog, https://techblog. ovacapta.de/ blog.qualitatsmanagement-dokumentationen, dated May 22, 2018 (German Translation).

(Continued)

*Primary Examiner* — Caroline H Jahnige
(74) *Attorney, Agent, or Firm* — FINNEGAN, HENDERSON, FARABOW, GARRETT & DUNNER LLP

(57) ABSTRACT

A method can include receiving a request for a read receipt by a first user of a predetermined user group for a session. The request for a read receipt can refer to an information segment of the thread supplied with a tag by the first user. The tag can include a predetermined character string identifying at least one second user from whom the first user requests the read receipt for the tagged information segment. The second user can be identified in a database, a notification containing the information segment to at least one second user can be sent and an acknowledgment message (Continued)

from the second user that he has read the notification containing the information segment can then be received for assigning a read receipt to the information segment as soon as the at least one second user has read the notification.

20 Claims, 4 Drawing Sheets

(51) Int. Cl.
*H04L 5/00* (2006.01)
*H04L 51/216* (2022.01)
*H04L 65/403* (2022.01)

(56) References Cited

U.S. PATENT DOCUMENTS

| 2011/0161424 | A1  | 6/2011  | Beringer et al. |
|---|---|---|---|
| 2011/0252105 | A1* | 10/2011 | Lee .................. H04L 51/04 709/206 |
| 2011/0307569 | A1  | 12/2011 | Sacks et al. |
| 2013/0024526 | A1  | 1/2013  | Sacks et al. |
| 2014/0223333 | A1  | 8/2014  | Pegg et al. |
| 2015/0271120 | A1* | 9/2015  | Langholz .............. H04L 51/216 709/206 |
| 2018/0331996 | A1* | 11/2018 | Zhang .................. H04L 51/234 |

OTHER PUBLICATIONS

So Funktionieren Genehmigungs—Workflows in SharePoint Ober den Blog, Unsere Autoren Ober den COMPAREX-Blog Datenschutz, Ein Blogbeitrag von Daniel Monch, Consultant Business Solutions, https://www.comparex-group. ::om/web/de/de/blog/topics/sharepoint, dated May 22, 2018 (German Translation).
International Preliminary Report on Patentability for PCT/EP2018/072442 dated Feb. 25, 2020 (German Translation).
International Search Report for PCT/EP2016/072442 dated Oct. 9, 2018 (German Translation).
Written Opinion of the International Searching Authority for PCT/EP2016/072442 dated Oct. 9, 2018 (German Translation).

* cited by examiner

COMPUTER-IMPLEMENTED METHOD FOR CONTROLLING A COLLABORATION PLATFORM, COMMUNICATION AND COLLABORATION APPLICATION AND COMMUNICATION AND COLLABORATION PLATFORM

CROSS-REFERENCE TO RELATED APPLICATIONS

The present application is a continuation application of, and claims the benefit of priority to U.S. patent application Ser. No. 16/638,160, filed on Feb. 11, 2020, which is the U.S. national stage application of International Patent Application No. PCT/EP2018/072442, filed on Aug. 20, 2018, which claims priority to German Patent Application No. 10 2017 119 183.6, filed Aug. 22, 2017. The entire contents of all of the above-referenced applications are hereby incorporated by reference.

FIELD

The invention relates to a computer-implemented method for controlling a collaboration platform, to a communication and collaboration application and to a communication and collaboration platform.

BACKGROUND

Communication and collaboration applications are becoming increasingly popular, particularly with regard to social networks. But in the business environment, it is also common today to integrate such applications into the workflow, where they serve users (USER) or user groups, for example, in a given session thread or context for processing a predetermined topic.

In a session, a user group which deals with a specific topic can be determined or selected. The discussion posts on the topic as well as questions and answers on the topic are received in a thread in a chronological and possibly hierarchical order and displayed to the users of the user group accordingly.

However, the documentation and control of the flow of information may make it necessary, particularly in the business environment, for a sender of information to draw the attention of one or more specific users of the user group to a particular information segment within the thread and to expect one or more users of the user group to receive feedback information about it. This feedback information, for example, may be a corresponding read notification so that the sender of information is notified that the information segment marked by him has been read by one or more users.

Read receipts are known in current communication and collaboration applications known from prior art; however, the information flow is limited to a simple bilateral exchange of information segments, and there is no possibility of generating the read receipt in the context of a session related to a specific topic.

For example, e-mail systems known from prior art provide read receipts for read e-mails. However, with regard to bilateral user conversations or in the case of multilateral conversations, for example, when using a mailing list during the sending of e-mails, they are not embedded in the context of a session or shared session where only a specific topic is being addressed.

Applications provided in social networks such as WhatsAPP, in which group conversations can also be conducted, also do not provide a selective read receipt for individually addressed group members, so a user in the group conversation has no opportunity to obtain information as to whether or not a specific other user has read a certain segment of such a group conversation.

SUMMARY

One objective of embodiments of the present invention is to provide a computer-implemented method of controlling a collaboration platform, a communication and collaboration application and a communication and collaboration platform, by means of which said deficiencies are remedied, at least in part. In particular, it is desirable that embodiments be configured so that a user of a predetermined user group for a session in a thread of the user group is allowed to request and receive a read receipt selectively for one or more information segments of the thread from one or more predetermined users of the user group.

Embodiments according to the present invention can include a computer-implemented method for controlling a collaboration platform is provided, on which a communication and collaboration application (COL_APP) runs, which allows a number of users of a predetermined user group to communicate and collaborate about a predetermined topic in a session in which the user group participates, with posts by individual users being collected and displayed as information segments in a thread, with the method comprising the following steps:

Receive a request for a read receipt by a first user of the predetermined user group of the session, in which the request for the read receipt refers to an information segment of the thread provided by the first user and supplied with a tag, with the tag comprising a predetermined character string identifying at least one second user from whom the first user requests the read receipt for the tagged information segment;

Identify the at least one second user in a database of the COL_APP;

Send a notification containing the information segment to the at least one second user;

Receive an acknowledgement message from the second user that he has read the notification containing the information segment; and Assign a read receipt to the information segment as soon as the at least one second user has read the notification, with the method further comprising a step to aggregate metadata with regard to the request of the first user for the read receipt and the acknowledgement message from the second user, and with information about the read receipt being transmitted to the first user by the provision of the metadata, in particular by displaying the metadata in a workflow-based view.

Embodiments of the method according to the invention can allow each user of a user group of a specific session running on the COL_APP on the collaboration platform to mark individual posts of the user in the form of selectable information segments in a thread for a predetermined topic of the session and then to selectively or individually request a read receipt from one or more predetermined users. According to the invention, this is achieved by providing or displaying the desired information on a meta-level.

According to one preferred embodiment, all users of the user group have access to the aggregated metadata so that, for each user of the user group of a predetermined session, information is available at any time about which user has read which posts or information segments of the thread. The read receipt function of COL_APP is a function shared by all users of a user group.

According to another preferred embodiment, the method further comprises the step of generating a status instance for the at least one second user. The metadata can also include:
An indication of the information segment;
Timestamp information regarding the time of the posting of the information segment by the first user;
User information about the first user, in particular an identification of the first user;
Timestamp information about the time of the receipt of the information segment by the second user and the time of the generation of a read receipt.

Thus, read receipts for all users of a shared session are generated and displayed via the communication and collaboration application in the context of a timestamp-based workflow. In particular, the meta-information for a session acquired from the relevant time stamp information or data with regard to the read receipt requests and associated acknowledgment messages for the session or thread is provided to all users of the user group.

According to yet another preferred embodiment, the method comprises the steps of
Creating timestamp statistics based on statistical data of the timestamp information;
Monitoring the timestamp statistics; and
Updating the statistical data of the timestamp information.

Preferably, the workflow-based view contains a sequence of individual information segments from the multiple information segments in chronological order within the thread for a predetermined session.

The workflow-based view may contain information as to whether the second user has read the information segment, with this being represented by visual modification of the character string identifying the second user.

The visual modification can be made by underlining or highlighting the information segment with color. This allows the user to quickly recognize at a glance whether a read receipt for an identified information segment has been received or not. Other presentation forms, however, are also possible.

According to the invention, a communication and collaboration application is provided, which is adapted to execute a method for selectively requesting and providing a read receipt for individual information segments within a thread of a user group with a predetermined number of users in a session.

Furthermore, a communication and collaboration platform can be provided, which is adapted to execute a method for selectively requesting and providing a read receipt for individual information segments within a thread of a user group with a predetermined number of users in a session. The communication and collaboration platform can be a type of communication apparatus that includes at least one computer device that hosts the platform. Each computer device can include hardware that includes a processor connected to non-transitory memory, at least one input device, at least one output device, and at least one interface or transceiver.

Additional features, functions, advantages and details of the present invention become clearer from the following description of specific embodiments and their graphic representation in the accompanying figures. It is understood that features, functions, advantages and details of individual embodiments are transferable to other embodiments and should also be considered as disclosed in connection with the other embodiments, unless this is apparently unfounded for technical or natural law reasons. In this sense, features of various embodiments can basically always be combined with each other, and the combination can also be understood as an embodiment of the invention.

BRIEF DESCRIPTION OF THE DRAWINGS

In the following, the invention will be described in more detail using examples of preferred embodiments and with the aid of the figures.

Figure 1:
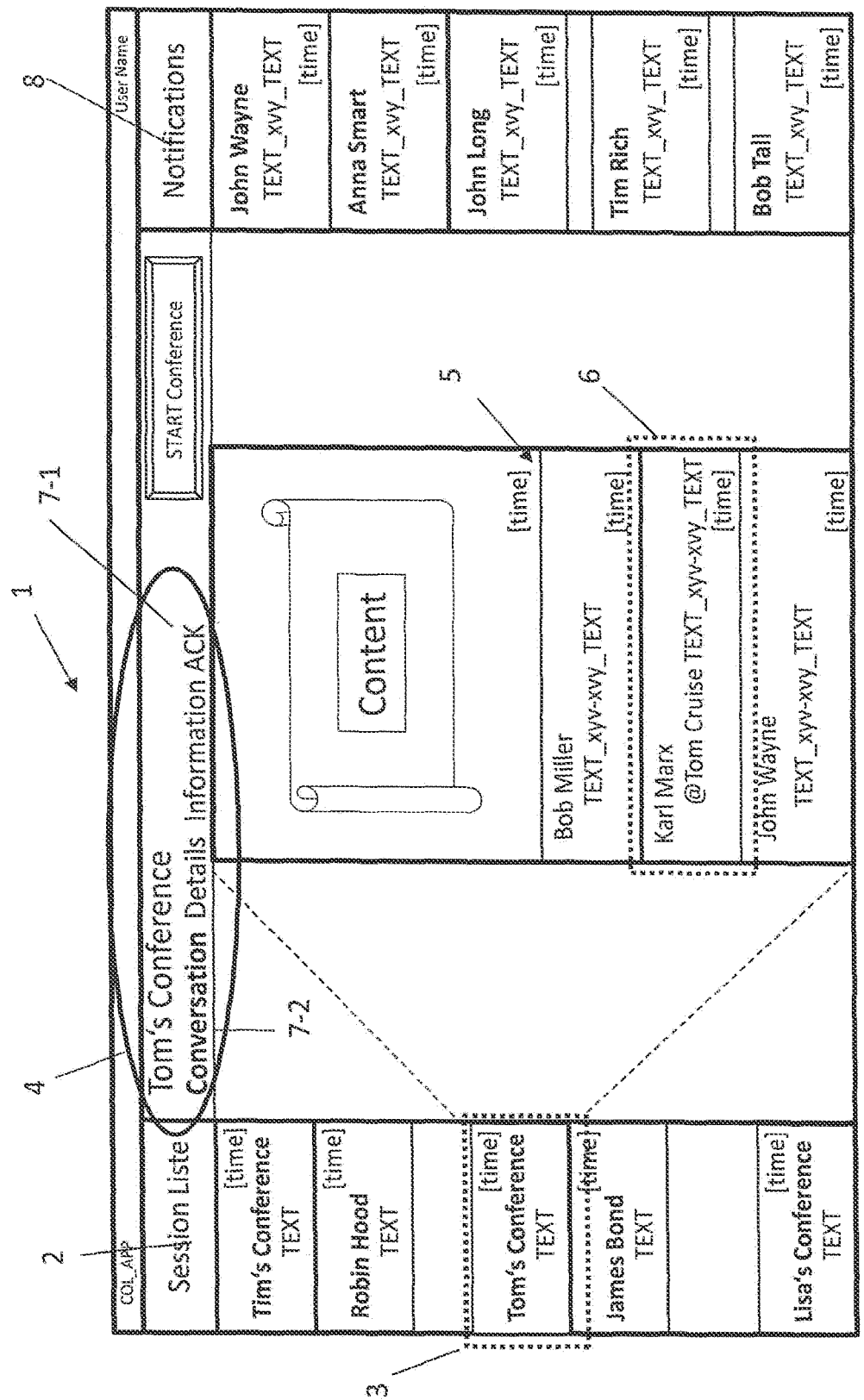
FIG. 1 is a representation of a communication and collaboration application (COL_APP) according to one embodiment of the invention with different logical structures.

Reference numerals used in the drawings include the below listed reference numbers:
1 Communication and collaboration application
2 Session list
3 Session
4 "Session selection" meta-level
5 Thread
6 Information segment
7-1/7-2 Metadata engine representation levels: 7-1: Information ACK, 7-2: Conversation
8 Notification list
9, 9' Display
10 Meta-level information field (display of aggregated session data)
11 Metadata engine
12 User status instance

DETAILED DESCRIPTION

FIG. 1 is a representation of a communication and collaboration application (COL_APP) according to one embodiment of the invention with different logical structures.

In the figure, first of all, it can be seen that on a collaboration platform (not shown) on which the COL_APP 1 is running as a centralized server function, a variety of sessions were installed or created, which is shown as session list 2 for a first user a in the display of COL_APP 1. For each additional user, a corresponding view is generated by COL_APP 1, i.e., a view in which a session list 2 is displayed with all sessions 3 running on the COL_APP 1. A predetermined number of users who form a user group participate in each session 3, for example, to work together on a given topic or specific task.

Furthermore, it shows how a session 3 selected by user a, with a gray background in the display and outlined by a dashed marking, is shown for the selected session on meta-level 4. Here the display of the selected information relevant to session 3 can be selected, including, among others
The sequence of information segments 6 according to the active selection of conversation 7-2 (see explanations below);
Information about the presence and member status of users in the user group of a session 3; and Aggregated meta-information on read receipt requests and read receipts (available under selection 'information ACK' 7-1).

In the middle portion of the display for COL_APP 1, thread 5 for the session 3 selected by user a is displayed. Here, all posts by the individual users of a user group participating in the selected session 3 are shown as information segments 6 (INFORMATION_SEGMENT), which are presented in chronological order with regard to the time when the posts or information segments 6 were posted.

In the event that the first user a wants to monitor whether a specific second user b, who also belongs to the user group for this selected session 3, reads a specific post or a specific information segment 6 of thread 5, he can now select the information segment 6 of interest (identified here by the dashed outline of information segment 6) and supplied or labeled with a tag. The tag includes a predetermined character string, which identifies second user b. The second user b can then be identified by COL_APP 1 accessing a database that is assigned to COL_APP 1 (not shown). The first user a creates the tag identifying user b by adding '@<user-name>', where "user-name" is replaced by the name of the second user b. The request made by the first user a for a read receipt of the predetermined information segment 3 by the second user b is then processed by a metadata engine 11 (see FIG. 4) of COL_APP 1. For this purpose, metadata are aggregated by COL_APP as the centralized server function, which include:

- An indication of the information segment 3;
- Timestamp information with reference to the time of the posting of the information segment 3 by first user a;
- User information about the first user a, in particular identification of the first user a; and
- Timestamp information about the time of the receipt of information segment 3 by the second user b and the time of the generation of a read receipt.

The metadata are used to arrange the read receipt request (READ_NOTIFICATION) of the first user a in the temporal sequence of the workflow for the selected session 3. The respectively identified individual metadata information of a session is then integrated by metadata engine 11, depending on the selection of the first user 1, at the respective meta-level (conversation 7-1 or information ACK 7-2) into the session presentation 6 or at aggregation level 10 (information ACK 7-2).

In the right column of COL_APP 1 shown in FIG. 1, a notification list 8 of the first user 1 is displayed, i.e., the list contains all notifications of other users of session list 2 which are directed to the first user 1.

Figure 2:
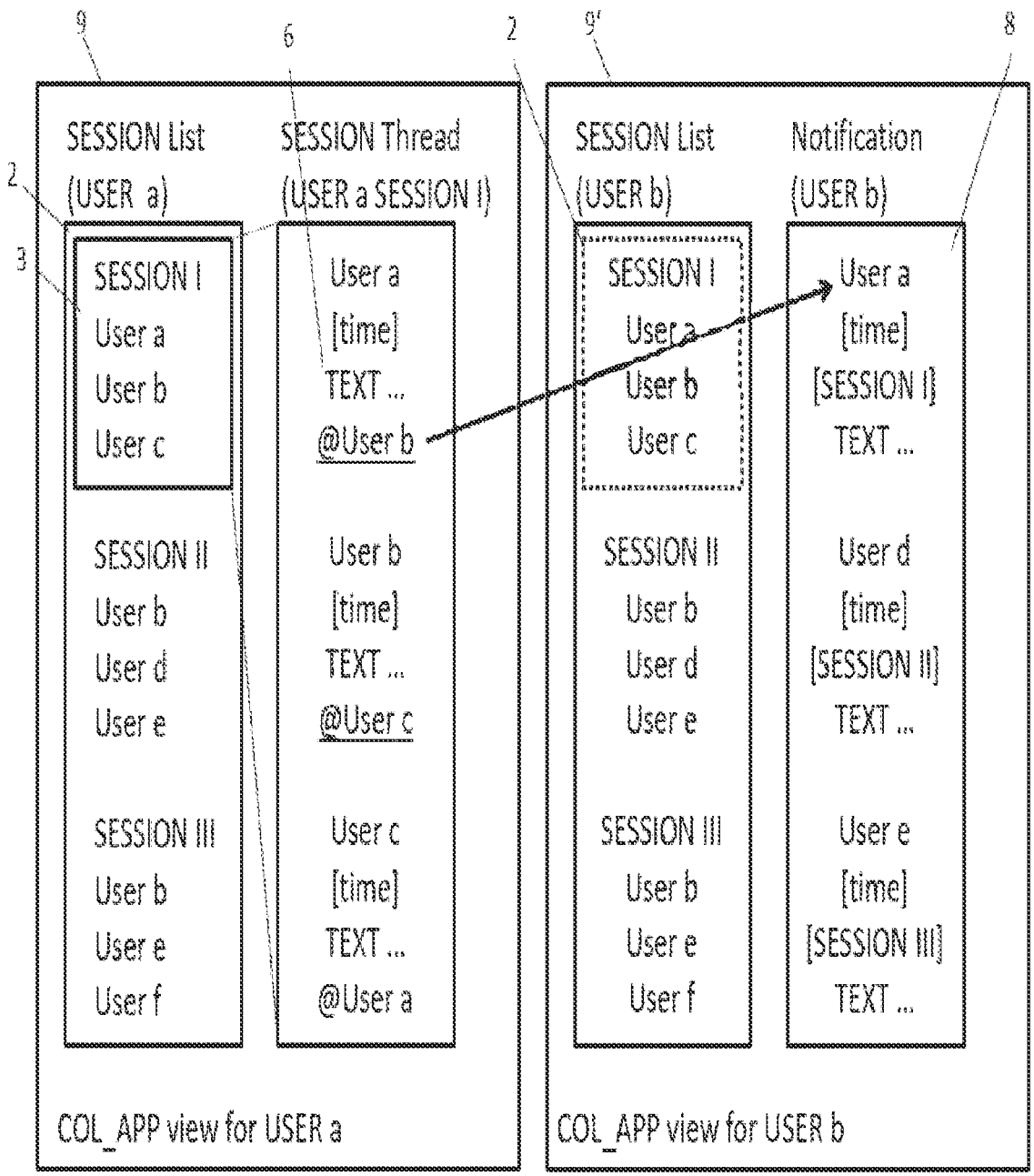
FIG. 2 is a further representation of parts of the COL_APP according to one embodiment of the invention.

FIG. 2 is an abstract representation of all session lists 2 of metadata engine 11 with a detailed view of parts of COL_APP 1 according to one embodiment of the invention with a focus on the processes for SESSION I. Here parts of the display 9 of COL_APP 1 are displayed on a screen of the first user a (left side of FIG. 2) and parts of the display 9' of COL_APP 1 on a screen of the second user b. They are respective session or conversation views of a predetermined SESSION I, identified by the reference numeral 3, on the side of the first user a and on the side of the second user b. In each case, on the left side of the respective view of the first user a and second user b, all session lists 2 of metadata engine 11 are displayed with sessions I, II, III, with SESSION I running on the collaboration platform via the COL_APP 1 of the first user a and second user b described here. Here the first user a is a participant in session 1 or belongs to the user group for session I, but does not belong to the user groups of session II and session III; thus, he is not a participant in sessions II and III.

The second user b, on the other hand, is a participant in all sessions I, II, III running on the metadata engine 11. On the screen or in the display 9 of COL_APP 1 for the first user a, session I is viewed, which is indicated by the dashed outline of the designation SESSION I and the participating users a, b, c, who form the user group for this session. For example, if the first user a has tagged an information segment 6 for a read receipt by the second user b as described in relation to FIG. 1, then in accordance with the selection of session I on the left side of the display 9 of the first user a, the information is displayed for the thread 5 in which the tagged information segment 6 (represented here by the placeholder 'TEXT') is located. In this case, the tag added by the first user a is underlined as soon as a read receipt by the second user b is present. Furthermore, it can be seen that in the marked session I, the second user b has requested a read receipt for an information segment selected by him from a third user c, who also has acknowledged the reading of the corresponding notification or of the information segment 6, which again is visualized by underlining the tag in the display 9 of COL_APP 1.

Furthermore, the third user c has requested a read receipt for an information segment 6 selected by him from the first user a, who, however, has not yet acknowledged receipt of the corresponding notification or the reading of the selected information segment 6, which is evident due to the lack of underlining of the tag.

It is also possible to make the meta-information visible that is associated with the time stamp information of the read receipt, for example, via a so-called "mouse-over function" for the user a on the display 9.

On the left side of FIG. 2, which shows the display 9' of the second user b, who is the recipient of the information segment 6 tagged by the first user a, it can be seen that in the right column of the display 9' all notifications for read receipts which are managed by the metadata engine 11 are listed information segments 6 selected by users. At the top of the right column in the display 9', it is indicated that the first user a has requested a read receipt for an information segment 6 belonging to session 1. In addition, a fourth user d has requested a read receipt from the second user b for an information segment 6 belonging to session 11, and a fifth user e has requested a read receipt from the second user b for an information segment 6 belonging to session 11. The notifications already acknowledged with a read receipt by the second user b, namely, the top and middle notifications, are visually marked here with a gray background. The notification not yet acknowledged by the second user b, on the other hand, does not have a gray background. So the second user b recognizes at a glance which information segment 6 he has already read or for which he has issued a read receipt and which, on the other hand, he has not read and still needs to read.

Figure 3:
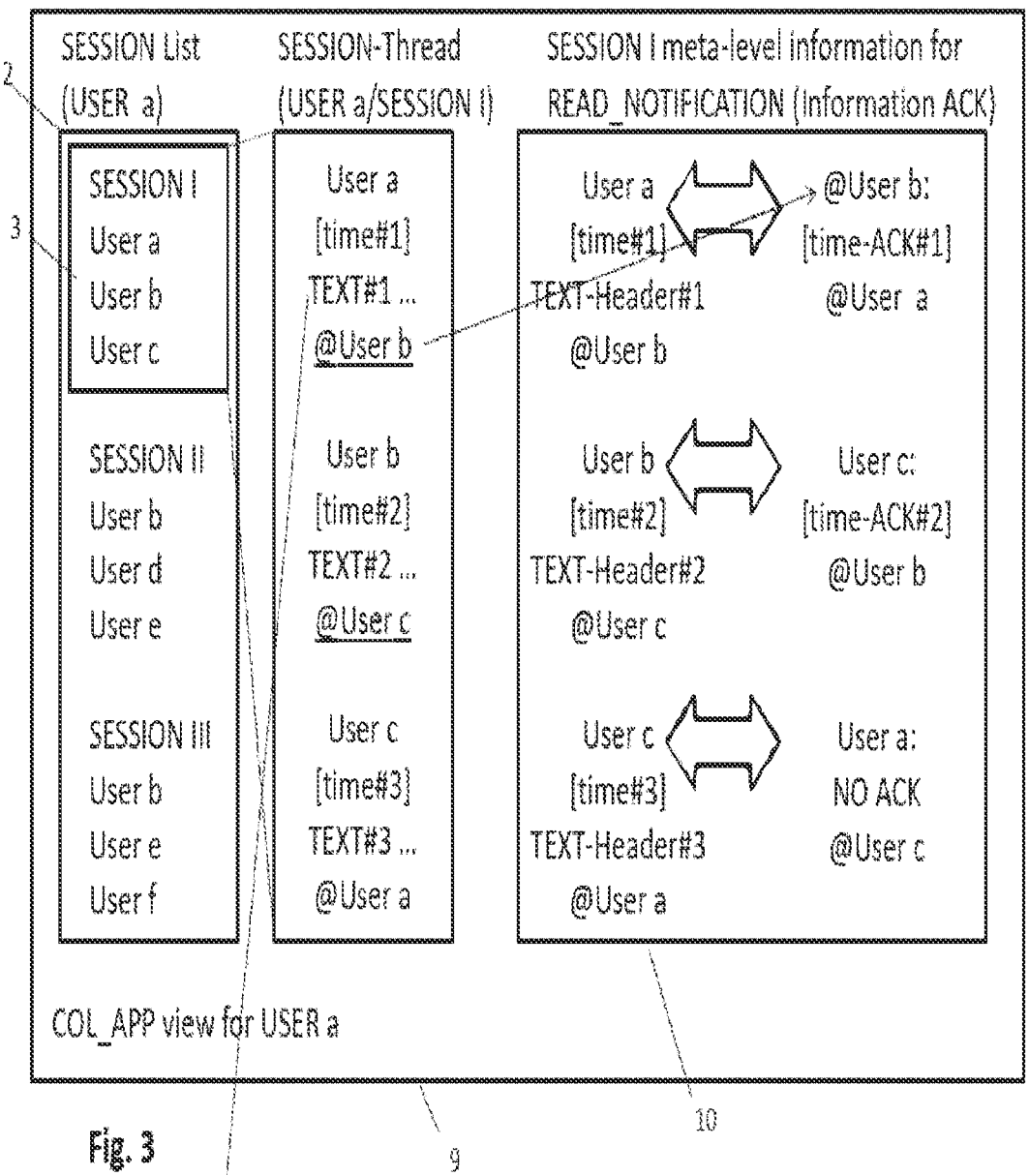
FIG. 3 is yet another representation of parts of the COL_APP according to one embodiment of the invention.

FIG. 3 is yet another representation of parts of the COL_APP 1 according to one embodiment of the invention. Here part of the display 9 of the first user a of COL_APP 1 is represented, with both columns on the left, i.e., the session list 2 and the information on thread 5, showing what has already been explained in relation to FIG. 2. In addition, another field 10 is displayed here, which represents the meta-level information for a read receipt of session I, which is selected by the first user a. The view presented here is a workflow-based view if Information ACK' (see FIG. 1: "session selection" meta-level 4) was selected. This view represents a complete view of collected and aggregated metadata arranged in the order of the respective timestamps with regard to the request for a read receipt for the predetermined session.

Each user of a session 3 (or here: users a, b and c of session I) is provided with an identical view of all aggregated metadata. In the embodiment presented here, the metadata view is stored in a timestamp-based flow for read receipt requests (READ_NOTIFICATION) and read receipts (ACKnowledge notifications). Based on statistics for the metadata, which are created or available in a COL_APP aggregation engine (see FIG. 4), further assessments are possible, e.g.:
- a list of users who did not respond to a read notification request (READ_NOTIFICATION);
- a list of users with the shortest/medium/longest response time with regard to accessing the notifications, etc.

As already mentioned above, "TEXT" in the figure represents a placeholder for the respective representation of an information segment 6, which is composed of a TEXT header (subject line) and the contents of the information segment 6. The contents of the information segment 6, for example, may include text or information on other media (e.g., files, images, videos, etc.).

Figure 4:
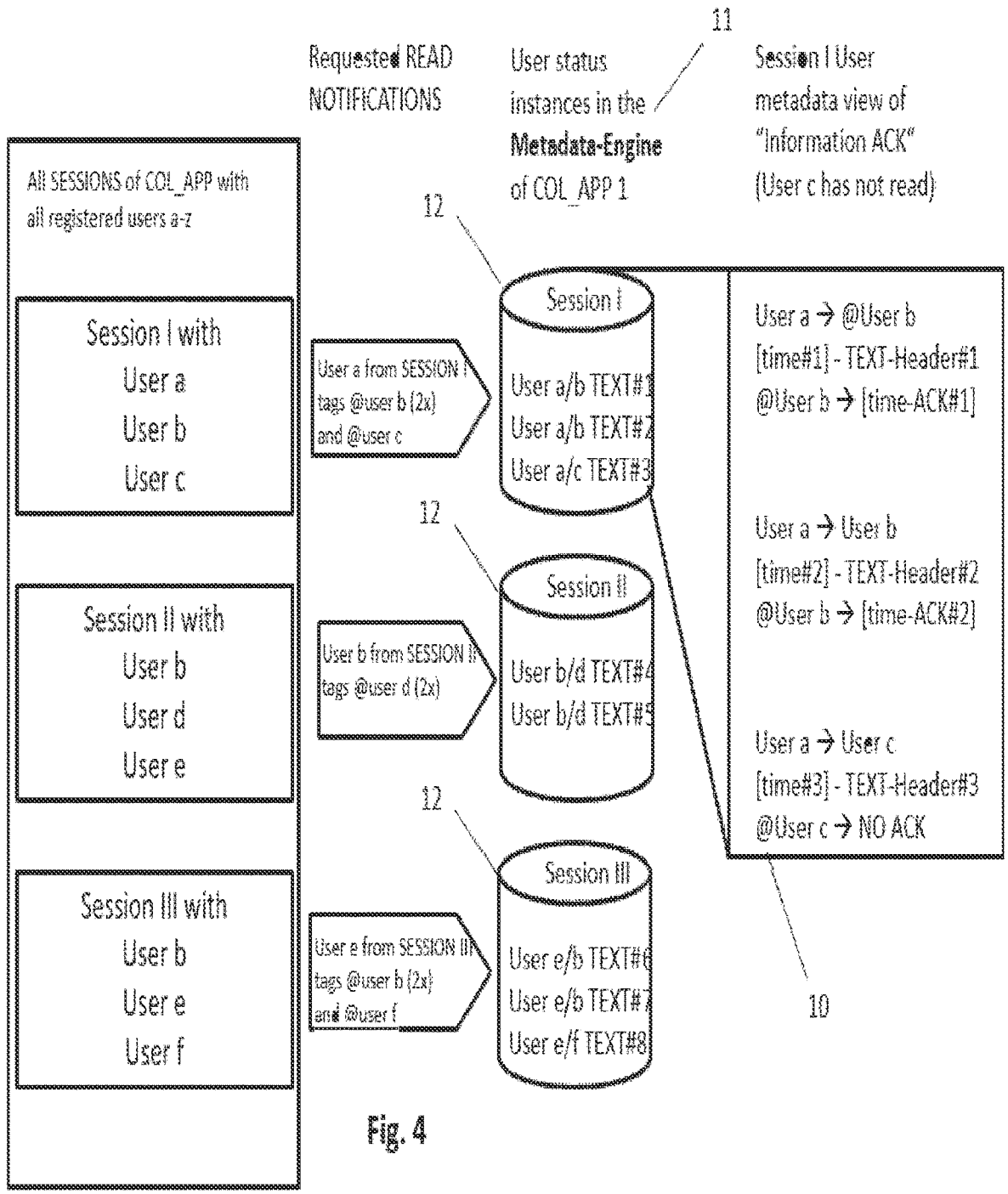
FIG. 4 is an abstract view representing the step of aggregating metadata for a session according to one embodiment of the invention.

FIG. 4 is an abstract view to represent the step for the aggregation of metadata 10 in a session 3 according to one embodiment of the invention, which is executed by the metadata engine 11 of COL_APP 1.

In this case, data is aggregated for the users of the COL_APP 1 on a session basis, thus for a respective session 3, so that a user in a session can create an individual request for a read receipt for each information segment of this session 3 or of the thread 5 running in the session 3 for one or more predetermined users of the session 3. Each user of the session 3, i.e., a predetermined user group, has identical access to the metadata of the session 3. To enable this, the metadata engine 11 generates a separate status instance or user status instance 12 individually for each session 3 for each appropriately tagged information segment 6. The statistical data of the status instance 12 thus generated is displayed in the meta-level view of the session 3 (Information ACK, see FIG. 1) and made available to all users of the session 3, or all users of the session 3 can access it.

The workflow and tasks of the COL_APP 1 during aggregation of the metadata from the perspective of the user requesting the read receipt (e.g., the first user a) and from the perspective of the user issuing the read receipt (e.g., the second user b) are explained in the tables below, which assume that the corresponding session of the participating users has already been defined and created in the COL_APP 1.

TABLE 1

View of the user requesting the read confirmation
(Session I, User a tags TEXT#1 for User b)

| Intent of the user requesting the read receipt | Task of the user requesting the read receipt | COL_APP Task | COL_APP display | Peer Task |
|---|---|---|---|---|
| User a in session I wants TEXT#1 to be read and acknowledged by user b | User a adds '@User b' to the selected and marked information segment TEXT#1 | | | |
| | | Metadata engine 11 generates status instance 12 for user b for session I and monitors timestamp statistics for all information segments of user b in session I | TEXT#1@User b | |
| | | | | User b reads TEXT#1 at time ACK#1 |
| | | Metadata engine 11 updates statistical time data | TEXT#1 @User b is underlined as read receipt | |
| User a wants to see detailed records of the read receipts | User a selects 'Information ACK Session View' 7-1 to access metadata | Metadata engine 11 calculates the most recent timestamp data of the relevant session status engine | Metadata view 10 of session I, as shown in FIG. 4 | |

TABLE 2

View of the user issuing the read confirmation
(Session I, user a tags TEXT#1 for user b)

| Intent of the user issuing the read receipt | Task of the user issuing the read receipt | COL_APP Task | COL_APP Display | Peer Task/ Event |
|---|---|---|---|---|
| | | | TEXT#1 Notification request is displayed in the notification list 8 of user b | |
| User b in session I would like to read TEXT#1 at time [time#1] | User b clicks on the message with TEXT#1 in the notification list 8 | | | |
| | | Metadata engine 11 updates the status instance 12 of user b for session I and monitors timestamp statistics for the time of the ACK #1 information | TEXT#1 @User b has a gray background in notification list 8 | TEXT#1 @User b is underlined as a read receipt |
| User a wants to see detailed records of the read receipts | User a selects 'Information ACK session view' 7-1 to access the metadata | Metadata engine 7 calculates the most current time stamp data of the corresponding session status engine | User metadata view for session I, as shown in FIG. 4 | |

While certain present preferred embodiments of a communication apparatus, communication system, communication device, communication terminal, non-transitory computer readable medium, and embodiments of methods for making and using the same have been shown and described above, it is to be distinctly understood that the invention is not limited thereto but may be otherwise variously embodied and practiced within the scope of the following claims.

The invention claimed is:

1. A computer-implemented method for controlling a collaboration platform, the method comprising:
receiving, from a first user, a read receipt request for an information segment posted in a thread, wherein the read receipt request comprises a tag identifying a second user;
sending a notification to the second user;
receiving, from the second user, an acknowledgment message indicating the second user has read the notification;
assigning a read receipt to the information segment;
providing, for a predetermined number of users, a display view with selectable options to select from a meta-level including a conversation level and a meta-level including an information acknowledgment level, the predetermined number of users including the first user and the second user;
aggregating, using a metadata engine configured to perform aggregation based on a selected meta-level including one of the conversation level or the information acknowledgment level, metadata with regard to the read receipt request and the acknowledgment message to generate aggregated metadata, the aggregated metadata including a portion of the metadata from a perspective of the first user and a portion of the metadata from a perspective of the second user; and
causing to display the aggregated metadata to the first user.

2. The method of claim 1, wherein the predetermined number of users have access to the aggregated metadata.

3. The method of claim 1, wherein the method further comprises:
generating a status instance for the second user, and wherein the aggregated metadata comprises:
an indication of the information segment;
a first timestamp information relating to a posting time of the information segment by the first user;
a user information with regard to the first user; and
a second timestamp information relating to a receipt time of the information segment by the second user and a generation time of the read receipt.

4. The method of claim 3, wherein the method further comprises:
creating timestamp statistics based on statistical data for the first timestamp information and the second timestamp information;
monitoring the timestamp statistics; and
updating the timestamp statistics.

5. The method of claim 1, wherein the information segment comprises individual information segments from multiple information segments, and wherein a workflow-based view comprises a sequence of the individual information segments from the information segments in chronological order within the thread of a selected session.

6. The method of claim 5, wherein, in the workflow-based view, the information about whether the second user has read the information segment is displayed by visual modification of the tag identifying the second user.

7. The method of claim 6, wherein the visual modification comprises underlining or colored highlighting of the information segment.

8. The method of claim 1, further comprising:
creating a list of users from the predetermined number of users who did not respond to the notification; and
creating a list of users from the predetermined number of users having a pre-selected range of response times with regard to accessing the notification.

9. A non-transitory computer-readable medium storing instructions for controlling a collaboration platform, the instructions, when executed by a processor, cause:
receiving, from a first user, a read receipt request for an information segment posted in a thread, wherein the read receipt request comprises a tag identifying a second user;
sending a notification to the second user;
receiving, from the second user, an acknowledgment message indicating the second user has read the notification;
assigning a read receipt to the information segment;
providing, for a predetermined number of users, a display view with selectable options to select from a meta-level including a conversation level and a meta-level including an information acknowledgment level, the predetermined number of users including the first user and the second user;
aggregating, using a metadata engine configured to perform aggregation based on a selected meta-level including one of the conversation level or the information acknowledgment level, metadata with regard to the read receipt request and the acknowledgment message to generate aggregated metadata, the aggregated metadata including a portion of the metadata from a perspective of the first user and a portion of the metadata from a perspective of the second user; and
causing to display the aggregated metadata to the first user.

10. The non-transitory computer-readable medium of claim 9, wherein the predetermined number of users have access to the aggregated metadata.

11. The non-transitory computer-readable medium of claim 9, storing further instructions that, when executed by the processor, cause:
generating a status instance for the second user, and wherein the aggregated metadata comprises:
an indication of the information segment;
a first timestamp information relating to a posting time of the information segment by the first user;
a user information with regard to the first user; and
a second timestamp information relating to a receipt time of the information segment by the second user and a generation time of the read receipt.

12. The non-transitory computer-readable medium of claim 11, storing further instructions that, when executed by the processor, cause:
creating timestamp statistics based on statistical data for the first timestamp information and the second timestamp information;
monitoring the timestamp statistics; and
updating the timestamp statistics.

13. The non-transitory computer-readable medium of claim 9, wherein the information segment comprises individual information segments from multiple information segments, and wherein a workflow-based view comprises a sequence of the individual information segments from the information segments in chronological order within the thread of a selected session.

14. The non-transitory computer-readable medium of claim 13, wherein, in the workflow-based view, the information about whether the second user has read the information segment is displayed by visual modification of the tag identifying the second user.

15. The non-transitory computer-readable medium of claim 14, wherein the visual modification comprises underlining or colored highlighting of the information segment.

16. The non-transitory computer-readable medium of claim 9, storing further instructions that, when executed by the processor, cause:
creating a list of users from the predetermined number of users who did not respond to the notification; and
creating a list of users from the predetermined number of users having a pre-selected range of response times with regard to accessing the notification.

17. A collaboration system, comprising:
a processor;
a memory storing instructions for controlling a collaboration platform, the instructions, when executed by the processor, causes:
receiving, from a first user, a read receipt request for an information segment posted in a thread, wherein the read receipt request comprises a tag identifying a second user;
sending a notification to the second user;
receiving, from the second user, an acknowledgment message indicating the second user has read the notification;
assigning a read receipt to the information segment;
providing, for a predetermined number of users, a display view with selectable options to select from a meta-level including a conversation level and a meta-level including an information acknowledgment level, the predetermined number of users including the first user and the second user;
aggregating, using a metadata engine configured to perform aggregation based on a selected meta-level including one of the conversation level or the information acknowledgment level, metadata with regard to the read receipt request and the acknowledgment message to generate aggregated metadata, the aggregated metadata including a portion of the metadata from a perspective of the first user and a portion of the metadata from a perspective of the second user; and
causing to display the aggregated metadata to the first user.

18. The collaboration system of claim 17, wherein the predetermined number of users have access to the aggregated metadata.

19. The collaboration system of claim 17, wherein the memory stores further instructions that, when executed by the processor, cause:
generating a status instance for the second user, and wherein the aggregated metadata comprises:
an indication of the information segment;
a first timestamp information relating to a posting time of the information segment by the first user;
a user information with regard to the first user; and a second timestamp information relating to a receipt time of the information segment by the second user and a generation time of the read receipt.

20. The collaboration system of claim 19, wherein the memory stores further instructions that, when executed by the processor, cause:
   creating timestamp statistics based on statistical data for the first timestamp information and the second timestamp information; and
   monitoring the timestamp statistics; and updating the timestamp statistics.

* * * * *